US009264408B2

(12) United States Patent
Carro

(10) Patent No.: US 9,264,408 B2
(45) Date of Patent: Feb. 16, 2016

(54) SECURE DELIVERY OF FILES TO AUTHORIZED RECIPIENTS

(71) Applicant: International Business Machines Corporation, Armonk, NY (US)

(72) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/718,538

(22) Filed: May 21, 2015

(65) Prior Publication Data

US 2015/0304285 A1    Oct. 22, 2015

Related U.S. Application Data

(63) Continuation of application No. 11/996,633, filed as application No. PCT/EP2006/061873 on Apr. 27, 2006, now Pat. No. 9,106,616.

(30) Foreign Application Priority Data

Jul. 27, 2005  (EP) ..................................... 05106928

(51) Int. Cl.
*G06F 21/00*    (2013.01)
*H04L 29/06*    (2006.01)
(Continued)

(52) U.S. Cl.
CPC ............ *H04L 63/0428* (2013.01); *H04L 51/08* (2013.01); *H04L 63/0861* (2013.01); *H04L 67/06* (2013.01)

(58) Field of Classification Search
USPC ......................................... 705/16, 21, 59, 71
See application file for complete search history.

(56) References Cited

U.S. PATENT DOCUMENTS 5,625,747 A      4/1997  Goldberg et al.
6,175,822 B1 *   1/2001  Jones ...................... H04L 29/06
                                                          178/21

(Continued)

FOREIGN PATENT DOCUMENTS

EP      1102429       5/2001
JP      10243105      9/1998

(Continued)

OTHER PUBLICATIONS

Notice of Allowance (Mar. 30, 2015) for U.S. Appl. No. 11/996,633, filed Jan. 24, 2008.

(Continued)

*Primary Examiner* — Dante Ravetti
(74) *Attorney, Agent, or Firm* — Schmeiser, Olsen & Watts, LLP; John Pivnichny

(57) ABSTRACT

A method and system for decoding an encrypted file. A recipient computer: receives, from a sender computer, the encrypted file having a filename that includes an encoded address; parses the received filename; extracts the encoded address from the parsed filename; accesses a voice check ticket at the extracted encoded address; receives voice check text from the voice check ticket; visually displays the received voice check text on a computer display of the recipient computer; prompts the recipient to read aloud the displayed voice check text; receives an audio signal from a reading aloud, by the prompted recipient, of the displayed voice check text; transmits the received audio signal to a server computer; receives, from the server computer, an encryption key after the server computer has verified, from analysis of the audio signal, the recipient's voice; and decrypts the received encrypted file using the received encryption key.

18 Claims, 5 Drawing Sheets

(51) Int. Cl.
*H04L 29/08* (2006.01)
*H04L 12/58* (2006.01)

(56) References Cited

U.S. PATENT DOCUMENTS

| | | | |
|---|---|---|---|
| 6,510,415 B1 | 1/2003 | Talmor et al. | |
| 6,529,602 B1 | 3/2003 | Walker et al. | |
| 6,529,871 B1 | 3/2003 | Kanevsky et al. | |
| 6,553,341 B1 | 4/2003 | Mullaly et al. | |
| 6,668,044 B1 | 12/2003 | Schwartz et al. | |
| 6,876,987 B2 | 4/2005 | Bahler et al. | |
| 7,644,280 B2 | 1/2010 | Carro | |
| 8,725,514 B2 * | 5/2014 | Jaramillo | G06F 21/32 704/270.1 |
| 2001/0033640 A1 | 10/2001 | Wuelly | |
| 2002/0023231 A1 | 2/2002 | Pathuel | |
| 2002/0046279 A1 | 4/2002 | Chung | |
| 2002/0169871 A1 | 11/2002 | Cravo de Almeida et al. | |
| 2002/0194279 A1 | 12/2002 | Chern | |
| 2003/0046083 A1 | 3/2003 | Devinney, Jr. et al. | |
| 2003/0112978 A1 | 6/2003 | Rodman et al. | |
| 2003/0135740 A1 | 7/2003 | Talmor et al. | |
| 2003/0164398 A1 * | 9/2003 | Walker | G06Q 10/06398 235/375 |
| 2003/0229492 A1 | 12/2003 | Nolan | |
| 2004/0088360 A1 | 5/2004 | Caughey | |
| 2004/0102959 A1 | 5/2004 | Estrin | |
| 2004/0121813 A1 | 6/2004 | Colson et al. | |
| 2004/0135740 A1 * | 7/2004 | Sato | G02B 27/26 345/6 |
| 2004/0165702 A1 | 8/2004 | Finnigan | |
| 2005/0015596 A1 | 1/2005 | Bowers | |
| 2005/0021984 A1 | 1/2005 | Hollander | |
| 2005/0074112 A1 | 4/2005 | Timmins | |
| 2005/0086188 A1 * | 4/2005 | Hillis | G06N 5/022 706/50 |
| 2007/0150723 A1 | 6/2007 | Estable et al. | |
| 2008/0235669 A1 | 9/2008 | Carro | |
| 2009/0144057 A1 | 6/2009 | Cabezas et al. | |
| 2010/0281254 A1 | 11/2010 | Carro | |

FOREIGN PATENT DOCUMENTS

| | | |
|---|---|---|
| JP | 2001144745 | 5/2001 |
| JP | 2002342145 | 11/2002 |
| JP | 2005267379 | 9/2005 |
| WO | 2005098566 | 10/2005 |

OTHER PUBLICATIONS

Office Action (Jan. 13, 2015) for U.S. Appl. No. 11/996,633, filed Jan. 24, 2008.
RCE (Jun. 6, 2012) for U.S. Appl. No. 11/996,633, filed Jan. 24, 2008.
Final Office Action (Mar. 13, 2012) for U.S. Appl. No. 11/996,633, filed Jan. 24, 2008.
Amendment (Dec. 23, 2011) for U.S. Appl. No. 11/996,633, filed Jan. 24, 2008.
Office Action (Sep. 28, 2011) for U.S. Appl. No. 11/996,633, filed Jan. 24, 2008.
Final Amendment (Aug. 18, 2011) for U.S. Appl. No. 11/996,633, filed Jan. 24, 2008.
Final Office Action (Jul. 29, 2011) for U.S. Appl. No. 11/996,633, filed Jan. 24, 2008.
Amendment (Jun. 1, 2011) for U.S. Appl. No. 11/996,633, filed Jan. 24, 2008.
Office Action (Mar. 3, 2011) for U.S. Appl. No. 11/996,633, filed Jan. 24, 2008.
Preliminary Amendment (Jan. 24, 2008) for U.S. Appl. No. 11/996,633, filed Jan. 24, 2008.
Patent Application for U.S. Appl. No. 14/718,421, filed May 21, 2015.

* cited by examiner

SECURE DELIVERY OF FILES TO AUTHORIZED RECIPIENTS

This application is a continuation application claiming priority to Ser. No. 11/996,633, filed Jan. 24, 2008.

FIELD OF THE INVENTION

The present invention relates generally to secure delivery of electronic documents and more specifically to a method and systems for verifying and confirming the reception of files by the intended recipient, employing automatic speech recognition and biometric voice speaker identification.

BACKGROUND OF THE INVENTION

E-mail allows persons (or even automatic robotics machines) to quickly and easily electronically send textual messages and other information such as, for example, a collection of pictures, sound recordings, and formatted documents to other e-mail users anywhere in the world. Anything that can be accessed as a file e.g., in hard disk folders or in network shared folders, can be included in an e-mail attachment. E-mail attachments can be images, documents, spread sheets, mp3 files, programs, and the likes. Once files are attached to an e-mail, the e-mail as well as the attached files can be transmitted over a communications network (e.g., the Internet) to other computer systems. A recipient user or other users accessing an attached file can detach the file to a local system storage for further processing.

A serious risk associated with the exchange of electronic information on open and unsecured networks, particularly on the Internet, is that an impostor could intercept an electronic communication, or access some of the information, such as an e-mail, and masquerade himself as the authorized recipient of said electronic communication.

It is often needed to deliver an electronic document to the intended recipient and then to make sure that the intended recipient, and not a different person, has indeed received the document. Likewise, it is often desirable to deliver an electronic document to the intended recipient and then to receive a confirmation that the intended recipient, after having received the document, has indeed opened and reviewed the content of the document.

Securing the delivery of documents to the intended recipients by verifying and confirming receipt of such delivered documents by the intended recipients may be needed, for example, in various legal or safety related applications. Furthermore, in such kind of applications, it is generally desirable that the recipient cannot easily repudiate receiving or viewing the document.

Previous approaches for securing the delivery to the intended and authorized recipients of electronic documents and files e.g., attached to e-mails, and obtaining receipt confirmations by the intended recipients, present some drawbacks. A first limitation is that generally the delivery confirmation can not positively demonstrate that the recipient actually has viewed, read or was otherwise made aware of the content of the received document. For example, according to the prior art methods based on providing a recipient private information, or digitally signing a confirmation message, the intended recipient may later repudiate the confirmation and assert that he or she did not send the confirmation. For example, the intended recipient may claim that the private information, such as a password, must have been compromised and was provided by another recipient. Also, an e-mail sender can receive an automatic confirmation that the e-mail has been successfully delivered to the recipient's e-mail server and that the e-mail has been opened, but there is not a verification and confirmation that the person who accesses and opens files attached to the e-mail is in fact the intended authorized recipient; moreover, there is not any confirmation about document opening i.e., if the recipient, being either the intended authorized recipient or another person, has in fact opened or read the files or documents attached by the sender to the delivered e-mail. In such a situation, the intended recipient may confirm that the e-mail has been received, but later deny that they actually were aware of the entire content of the e-mail and/or the content of the e-mail attached files.

While most of the modern e-mail systems enable to configure an e-mail to transmit a message to the sender confirming the reception and opening of the e-mail by the recipient (supposedly, by the intended recipient), there is no equivalent mechanism informing the sender that a file attached to an e-mail has been opened by the recipient. Moreover, there is no mechanism provided to assure and confirm to the sender of an e-mail that all files attached to the e-mail, even after being detached and saved for future processing, have been opened and accessed by the authorized intended recipient of said files.

As a consequence, there is a need for a method and systems enabling senders of electronic documents and files attached to e-mail to assure, verify and confirm in a non-repudiable manner the delivery of those documents and files to the intended recipients.

SUMMARY OF THE INVENTION

Thus, it is a broad object of the invention to remedy the shortcomings of the prior art as described here above.

It is another object of the invention to provide an improved method and systems for securing the delivery of electronic documents and files to the intended recipients.

It is also another object of the invention to provide an improved method and systems for securing the delivery of electronic documents and files to the intended recipients, adapted to verify the identity of the user requesting access to a file before enabling the user to access the content of the file.

It is a further object of the invention to provide an improved method and systems for securing the delivery of electronic documents and files to the intended recipients, adapted to provide the sender of a file a non-repudiable confirmation of the access to the content of the file by the intended recipient.

It is still a further object of the invention to provide an improved method and systems for securing the delivery of electronic documents and files to the intended recipients by using voiceprints.

The accomplishment of these and other related objects is achieved by a method for encoding a file to be transmitted in a computer network to an intended recipient, for authenticating the recipient and confirming the reception of said file by said intended recipient, using biometric voice identification, the method comprising the steps of, selecting an encryption key;
associating a voice check ticket to said encryption key;
determining the address of said voice check ticket comprising at least said encryption key;
encrypting said file to be transmitted using said encryption key; and,
associating said voice check ticket address with said file,
by a method for decoding a file encoded according to the previous method, said method comprising the steps of,
extracting the address of a voice check ticket from said file and decoding said voice check ticket address;

accessing a voice check text associated to said voice check ticket at said voice check ticket address;

transmitting a reading of said voice check text;

receiving a decryption key if the voiceprint of said reading matches the voiceprint associated to said voice check ticket; and, decrypting said file using said decryption key, and by a method for authenticating the recipient of a file encoded according to the previous method, comprising the steps of, upon request from said recipient, transmitting the voice check text associated to the voice check ticket that address is received with said request;

upon reception from said recipient of a text reading, extracting a voiceprint from said text reading;

comparing said extracted voiceprint with the voiceprint associated to said recipient; and, if said extracted voiceprint corresponds to the voiceprint associated to said recipient, transmitting, to said recipient, the encryption key associated to said voice check ticket Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

According to the invention, a method and systems for securing the access to an electronically transmitted file and for verifying and confirming that the intended recipient has received and opened the file, and not anybody else, is disclosed. The main principle consists in combining an encryption key with the recipient voiceprint so that the encrypted file received by a recipient can only be decrypted with the encryption key, the encryption key being transmitted to the recipient after he/she read a predetermined text if the voiceprint of this reading corresponds to the recipient voiceprint.

As it is generally known, most voice biometric solutions create a voice print of the user, a template of the person's unique voice characteristics created when the user enrolls with the system. All subsequent attempts to access the system require the user to speak, so that their live voice sample may be compared against the pre-recorded template. For example, a reference on this subject is U.S. Pat. No. 6,529,871, by Kanevsky, entitled "Apparatus and method for speaker verification/identification/classification employing non-acoustic and/or acoustic models and databases".

Figure 1:
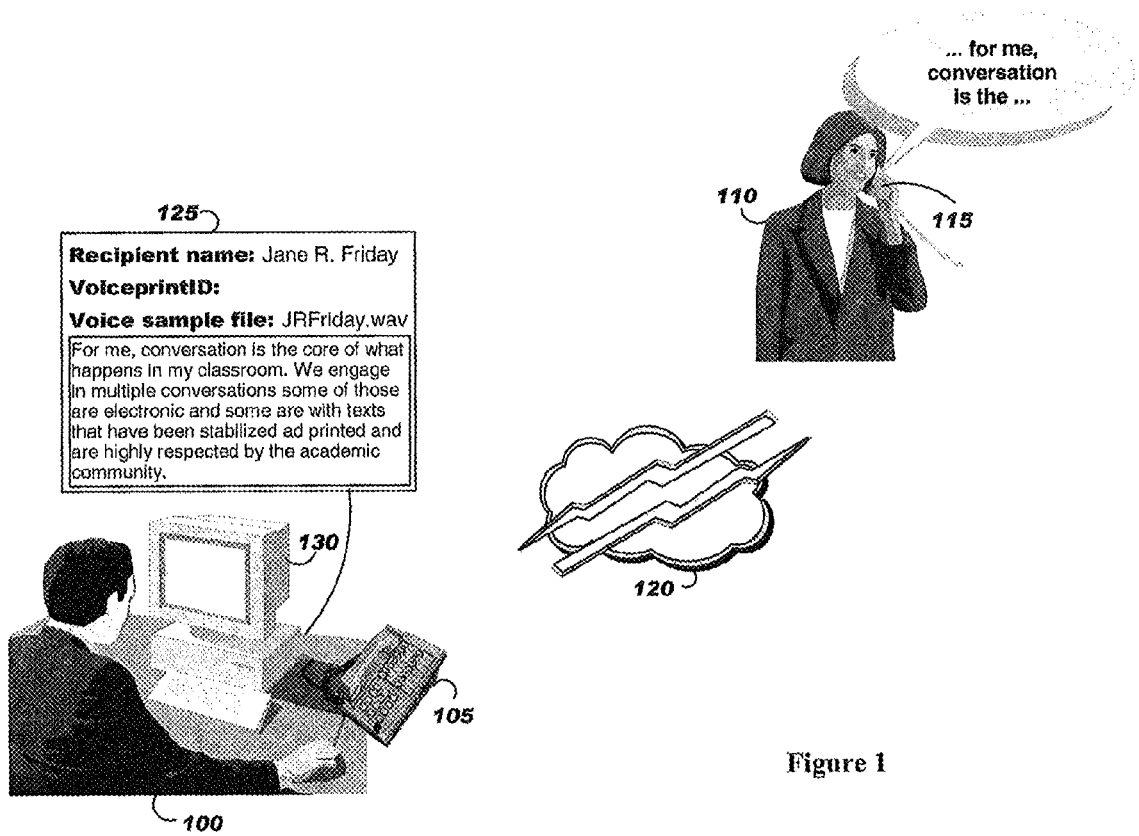
FIG. 1 depicts an example showing how a user can record the voice of another person to whom he/she wants to send a document according to the method of the invention.

FIG. 1 depicts an example showing how a user can record the voice of another person to whom he/she wants to send a document according to the method of the invention. In this example, a portion of the phone conversation is recorded in a database of voice records. As shown, the user 100 having a phone 105 can call a user 110 having a phone 115 through standard Public Switched Telephone Network (PSTN) 120. In such case, the user 100 is referred to as the sender and the user 110 is the recipient. During the call, the sender 100 can record a part of the conversation so as to determine later the voiceprint of the recipient 110. In a preferred embodiment, the sender 100 stores a recipient voice record in a database of voice records. Still in a preferred embodiment, each recipient voice record comprises the name of the recipient, the identifier of the recipient voiceprint and a recording of recipient voice, as illustrated with reference 125. The database of voice records can be stored locally in the sender's computer or handheld device 130 or in a remote server (not shown) accessible through a public network e.g., Internet, or a private network.

Figure 2:
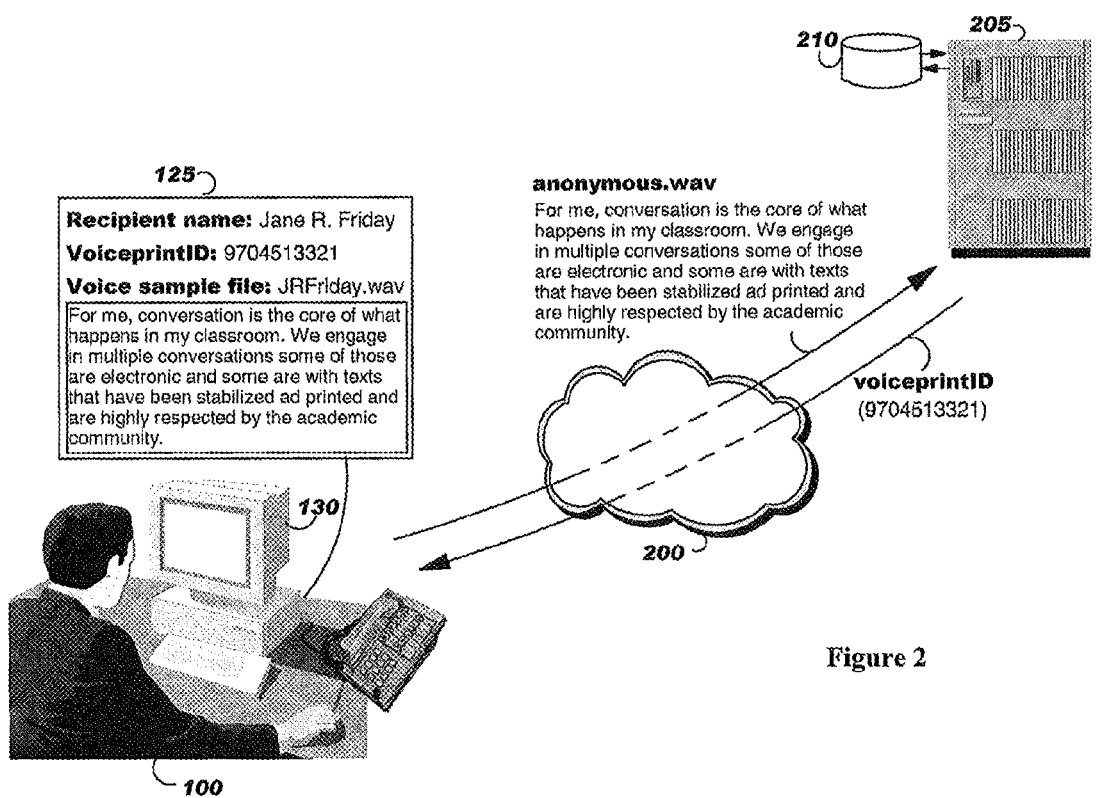
FIG. 2 illustrates an example of a system for determining and storing voiceprints.

After having recorded a sample of the recipient's voice, the sender must determine the recipient's voiceprint. This can be done locally, on a generic server, or on a specific voice check server. For sake of illustration, determination of voiceprint and voiceprint storage is done on a specific voice check server, as depicted on FIG. 2. After the sender 100 has stored a sample of the recipient's voice as recipient voice record, the sample is transmitted, totally or partially, through a private or public network 200 e.g., Internet, to a specific voice check server 205. Still in a preferred embodiment, the voice's sample is transmitted as an anonymous audio file. Voice check server 205 processes the voice sample, computes and stores the recipient's voiceprint, and assigns an identifier (ID) to the voiceprint. The voiceprint and the associated ID are locally stored in a voiceprint database 210. The voiceprint ID is then transmitted to the sender's computer 130 where it is locally stored. For example, the voiceprint ID can be stored within the recipient voice record 125 as discussed above.

For encrypting a file to be sent, the sender 100 must first obtain a sample of recipient's voice and a voiceprint ID as disclosed above. Then, the sender preferably creates a voice check ticket. The sender can also ask to the voice check server or to a third party server for a voice check ticket. A voice check ticket mainly consists in a voiceprint ID, an encryption key and a voice check text. The encryption key associated to the voice check ticket is used by the sender to encrypt the file to be transmitted. The voice check ticket is then transmitted to the voice check server that transmits back the address or Universal Resource Locator (URL) of the voice check ticket i.e., the address from which the voice check ticket can be downloaded. The address or URL of the voice check ticket is encoded within the name of the encoded file to be transmitted.

Figure 3:
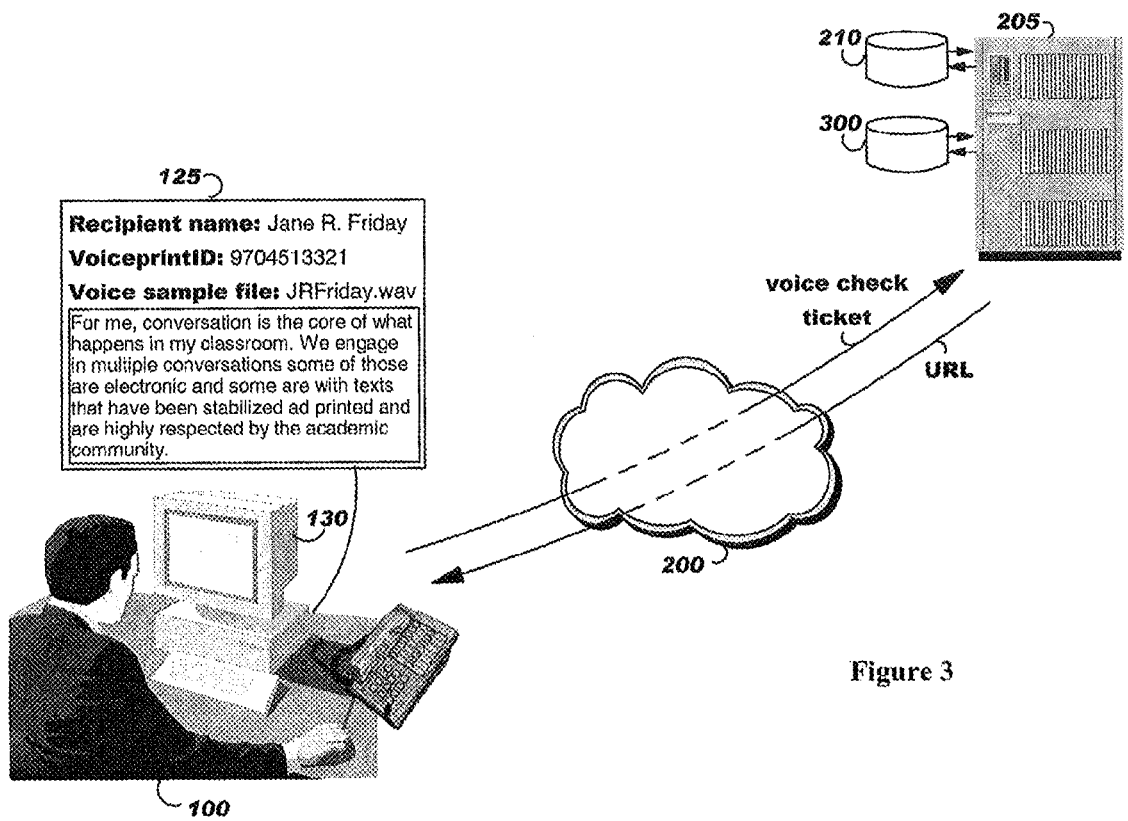
FIG. 3 illustrates how, according to the invention, the voice check ticket associated to an encrypted file to be sent is uploaded from the sender's computer to the voice check server.

FIG. 3 illustrates how, according to the invention, the voice check ticket associated to an encrypted file to be sent is uploaded from the sender's computer 130 to the voice check server 205. After the sender's computer has transmitted the voice check ticket to the voice check server, the voice check ticket is preferably stored in a voice check ticket database 300 of the voice check server 205. As depicted, the voice check server 205 responds to the sender's computer 130 by transmitting the address or URL of the voice check ticket i.e., the address or URL from which the voice check ticket can be downloaded. The address or URL is preferably stored in a reserved field of the local copy of the voice check ticket in the sender's computer 130.

Figure 4:
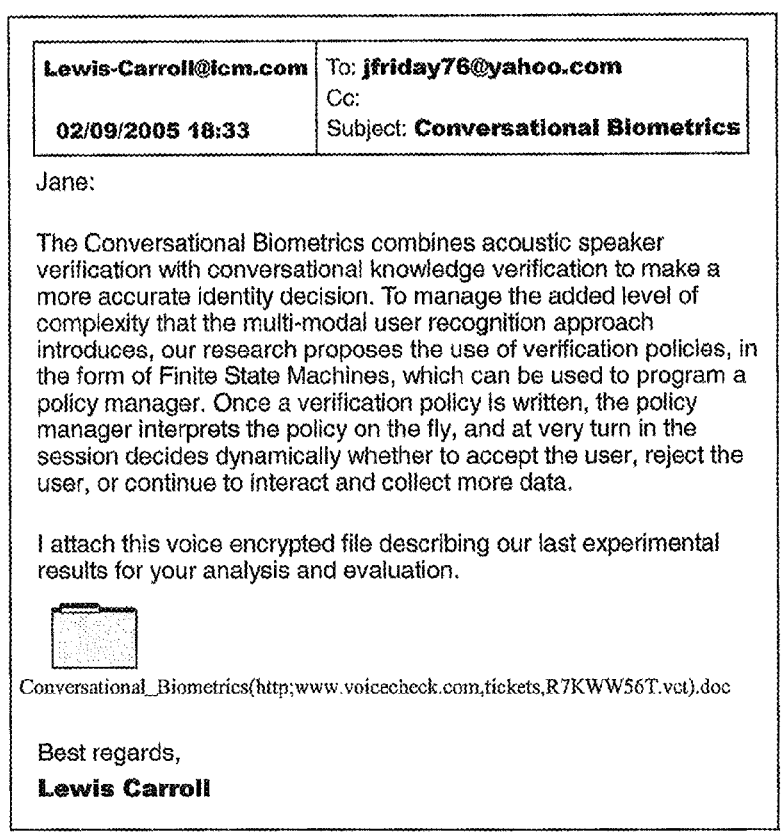
FIG. 4 shows a particular example of the invention where a sender attaches, to an e-mail, an encrypted file linked to a voice check ticket stored in a voice check server.

FIG. 4 shows an example of the application of the present invention in which a sender, Lewis Carroll, attaches, to an e-mail, an encrypted file linked to a voice check ticket stored in a voice check server. When the e-mail is received, the voice check ticket must be accessed by the recipient (Jane R. Friday) for verifying her identity, for confirming the reception of the file, and for decrypting the file. This figure also illustrates how the address or URL of Voice Check Ticket (e.g., hyperlink "http://www.voicecheck.com/tickets/R7KWW56T.vct") can be encoded within the filename of the attached file using a specific lexicography. For example, a particular lexicography consists in replacing characters or group of characters valid in the lexicography of URLs, like "://", and "/", by characters valid in the lexicography of file names, like ";" and ",", respectively. According to the invention, when the e-mail recipient clicks the icon of a file attachment linked to a voice check ticket, the filename of attached file is parsed and the URL of the voice check ticket is extracted and decoded from the same file name. Using the extracted URL, the hyperlink is triggered for accessing and performing on voice check server the voice identification and voice check ticket validation operations required for verifying the file reception by the intended recipient and for retrieving from voice check server the encryption key needed for decrypting the received file.

Figure 5:
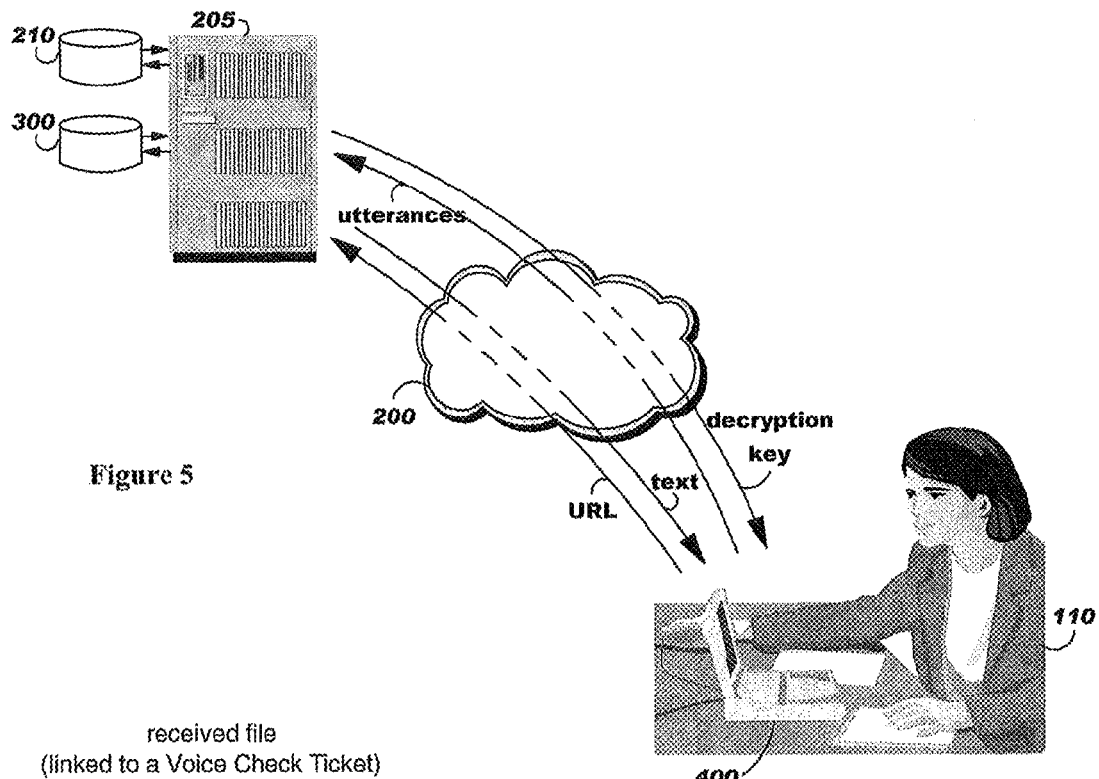
FIG. 5 depicts an example of the voice check ticket processing when a recipient receives an encrypted file embedding an address or URL of a voice check ticket.

FIG. 5 depicts an example of the voice check ticket processing when a recipient receives an encrypted file embedding an address or URL of a voice check ticket. When the voice check ticket is accessed by the recipient 110 in the voice check ticket database 300 of the voice check server 205, the voice check text of the voice check ticket is extracted and transmitted from voice check server to the recipient's computer or handheld device 400. Received voice check text is displayed, and the recipient 110 is prompted to read aloud this text for performing file reception confirmation and recipient identity verification. As discussed above, the recipient is prompted to read aloud a voice check text for verifying, by speech recognition and voice identification, that the recipient is the person allowed to open the file. When the recipient reads aloud the received voice check text, the utterances of the recipient 110 are preferably recorded on the recipient's computer 400, and are transmitted to the voice check server 205. Utterances received on voice check server 205 are decoded by speech recognition and compared with the voice check text component of the voice check ticket. Additionally, the voiceprint of the received utterances is computed and compared with the recorded voiceprint file corresponding to the same voiceprint ID. If the result of both checks is positive, the identity of the intended recipient is verified, and the encryption key is transmitted to the recipient's computer 400 for decrypting the file. By accessing and retrieving the voice check ticket stored on voice check server 205, the sender 100 gets a non-repudiable confirmation of the reception of the file by the intended recipient 110, or may be aware of unsuccessful attempts to open the file by non authorized recipients or impostors.

Figure 6:
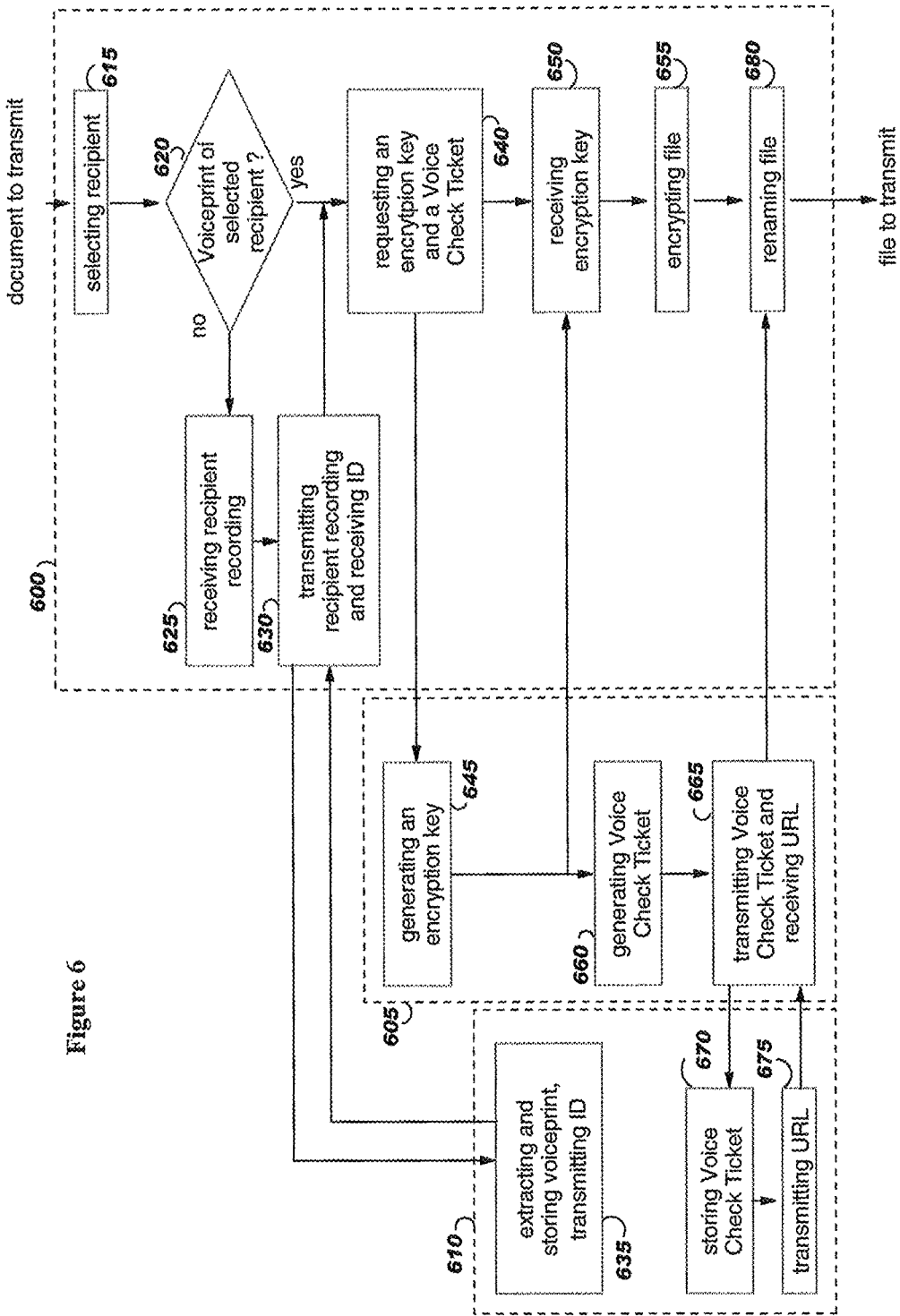
FIG. 6 illustrates an example of the general algorithm for encrypting a document to be transmitted.

FIG. 6 illustrates an example of the general algorithm for encrypting a document to be transmitted. Depending upon its implementation, the algorithm can be divided into several modules running on one or different computers or servers. According to the example of FIG. 6, the algorithm is split up amongst three different parts, the sender's computer module 600 (or a network server accessible to the sender), a security server module 605, and a voice check server module 610. After having selected the name of the recipient to whom the document or file should be transmitted by typing the recipient name, selecting the name in a list or according to a similar known interface method (step 615), the sender's computer module 600 determines whether or not a voiceprint of the selected recipient already exists (step 620). For example, the sender's computer module 600 can host a table wherein recipient names are associated to recipient IDentifier (ID) so that such ID may be used to select a specific voiceprint in a voiceprint database stored in a voice check server. According to such example, checking if a recipient voiceprint exists consists in checking the presence of the recipient name in the table. If none voiceprint exists for the selected recipient, the sender's computer module 600, receives a recipient recording via a network interface, a phone system, or any equivalent system (step 625). The recipient recording is transmitted to the voice check server module 610 from which it receives the corresponding ID (step 630). Voice check server module 610 extracts the voiceprint from the received recipient recording, determines an ID, and stores this voiceprint with the corresponding ID in a voiceprint database (step 635). It should be noticed that alternatively, the recipient may transmit an audio recording of his/her voice directly to the voice check server module 610.

If a voiceprint has been associated to the selected recipient, the sender's computer module 600 sends a request for an encryption key and a Voice Check Ticket (VCT) to the security server module 605 (step 640). As mentioned above, the security server module 605 can be merged with the sender's computer module 600 so that the encryption key is generated in the sender's computer and the voice check ticket is also created by the sender's computer. The security server module 605 generates an encryption key (step 645) to be used by a standard predetermined encryption algorithm, for example a public key algorithm such as RSA. The encryption key is received by the sender's computer module 600 (step 650) that uses it to encrypt the file to be sent (step 655). Additionally, the security server module 605 generates a voice check ticket (step 660). As discussed above, each voice check ticket preferably comprises a voiceprint ID, an encryption key and a voice check text. Voiceprint ID is determined by the sender's computer module 600 according to the selected recipient while the encryption key and the voice check text are determined by the security server module 605. The encryption keys are randomly generated according to standard key generation algorithm. Voice check texts can be generated in different ways. For example, a voice check text can be written by the sender such as a declarative confirmation of the reception of the encrypted file by the recipient. Voice check text can also be selected by the sender e.g., by copying a portion of the e-mail text to which the encrypted file is attached. Alternatively, the voice check text can be automatically generated by the voice check server module 610 e.g., by randomly selecting a text from a library of documents stored or accessed from said server.

The voice check ticket is then transmitted to the voice check server module 610 (step 665) to be stored in a voice check ticket database (step 670). The voice check server module 610 returns the address or URL of the stored voice check ticket to the security server module 605 (step 675) that in turn, transmits the address or URL of the stored voice check ticket to the sender's computer module 600 (step 665). The address or URL of the stored voice check ticket is then encoded within the name of the file to be transmitted (step 680), in the sender's computer module 600. The file is then ready to be transmitted since it is encoded and contains information allowing the intended recipient to decrypt it.

Figure 7:
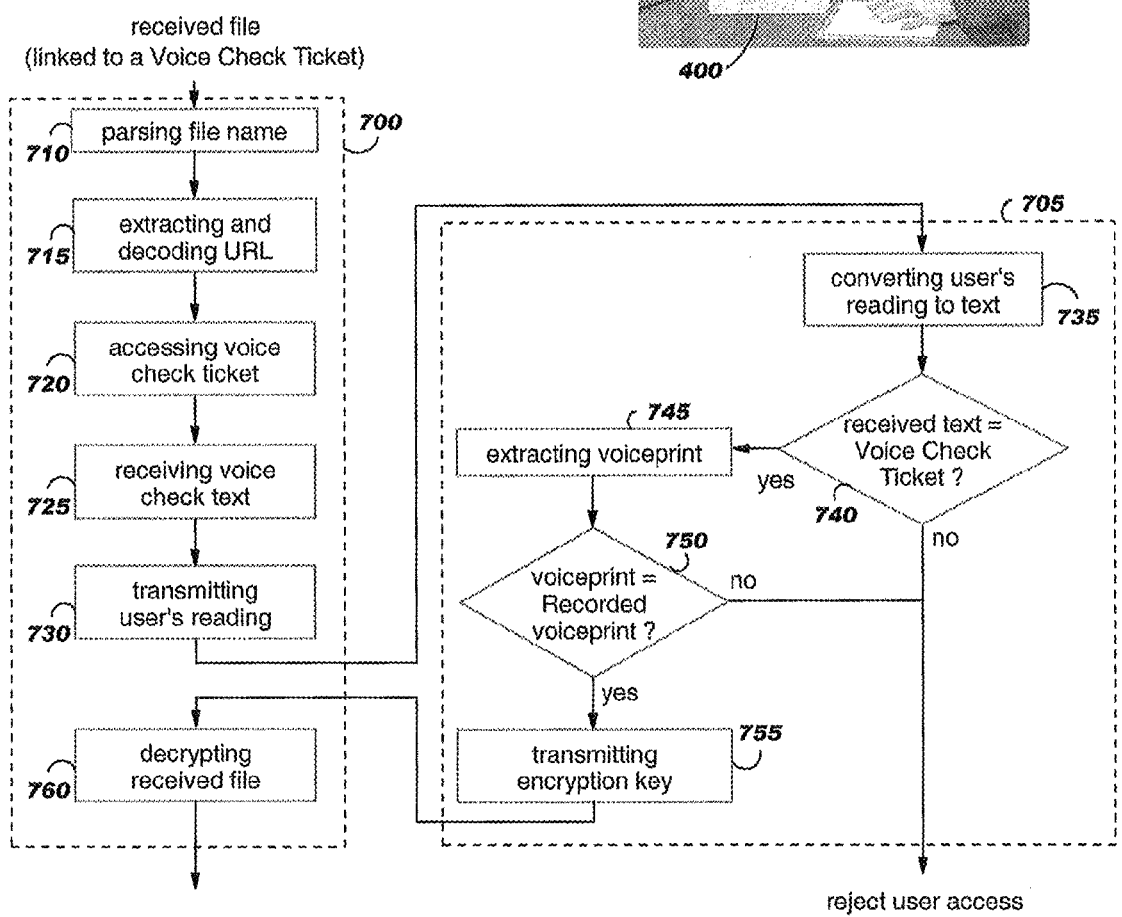
FIG. 7 illustrates the main steps of the method, according to the invention, for confirming the reception of a file by the intended recipient, for verifying the identity of the recipient, and for delivering the encryption key to the authorized recipient.

FIG. 7 illustrates the main steps of the method, according to the invention, for confirming the reception of a file by the intended recipient, for verifying the identity of the recipient, and for delivering the encryption key to the authorized recipient. In the preferred embodiment, such algorithm comprises two different parts, a first one referred to as 700 being implemented within the recipient's computer or handheld device and a second one referred to as 705 being implemented within the voice check server. After having received a file encrypted according to the method of the invention such as the one described by reference to FIG. 6, for example as an attachment of an e-mail, the filename is parsed (step 710) and the address or URL of the voice check ticket is extracted and decoded from the parsed filename (step 715). The extraction and decoding of the address or URL from the parsed filename depends upon the lexicography used for the encoding step. An example of lexicography, coding and decoding is described herein below. Once the address or URL has been recovered, the voice check ticket is accessed (step 720) so as to receive the voice check text contained in this voice check ticket (step 725). The voice check text is displayed on the recipient computer display so that the recipient can read aloud the text. Recipient's reading is transmitted to the voice check server as an audio signal (step 730), either analog or digital signal. The received audio signal is converted to text by the voice check server (step 735) according to a standard speech recognition engine and a test is done to compare the converted text and the voice check text (step 740). If the converted text is different than the voice check text, the recipient's request is rejected else, if the converted text is identical to the voice check text, the voiceprint of the received audio signal is computed (step 745). This voiceprint is then compared with the one associated to the recipient identifier stored in the voiceprint database of the voice check server (step 750). For example, the recipient identifier can be transmitted by the recipient itself with audio recording. If voiceprints are different, the recipient's request is rejected else, the voice check server transmits the encryption key to the recipient's computer or handheld device (step 755) so that the received filed is decrypted by the recipient's computer (step 760). In a particular embodiment of the invention, the voice check text of the voice check tickets is automatically modified to a different text by the voice check server so that, for each attempt to access the file, different voice check texts are transmitted to the recipient for identification. According to this embodiment, the voice check text is modified when the recipient has been identified and the decryption key has been sent to the recipient. Alternatively, in another embodiment of the invention, once the recipient has been identified and the decryption key has been sent by the first time to the recipient, the voice check ticket is automatically erased and discarded from the voice check server so that, once the file has been decrypted by the first time, further attempts to decrypt the same file would fail.

For encoding the address or URL within the name of the file to transmit, a specific lexicography is determined so as to avoid particular characters that may be forbidden by the file system, e.g., "\" with Microsoft Windows system (Windows is a Trademark of Microsoft Corporation), and/or to encode the addresses so as to reduce their sizes. Addresses to be encoded may be of any forms e.g., local addresses, addresses in private networks or Internet addresses, however, for sake of illustration, the examples given in the following description are based on URL type of addresses.

Figure 8A:
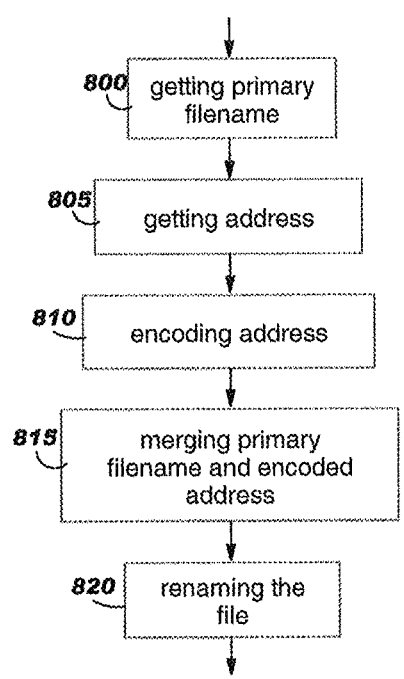
FIGS. 8a and 8b illustrate an example of the algorithm used to encode an address in a filename.
Figure 8B:
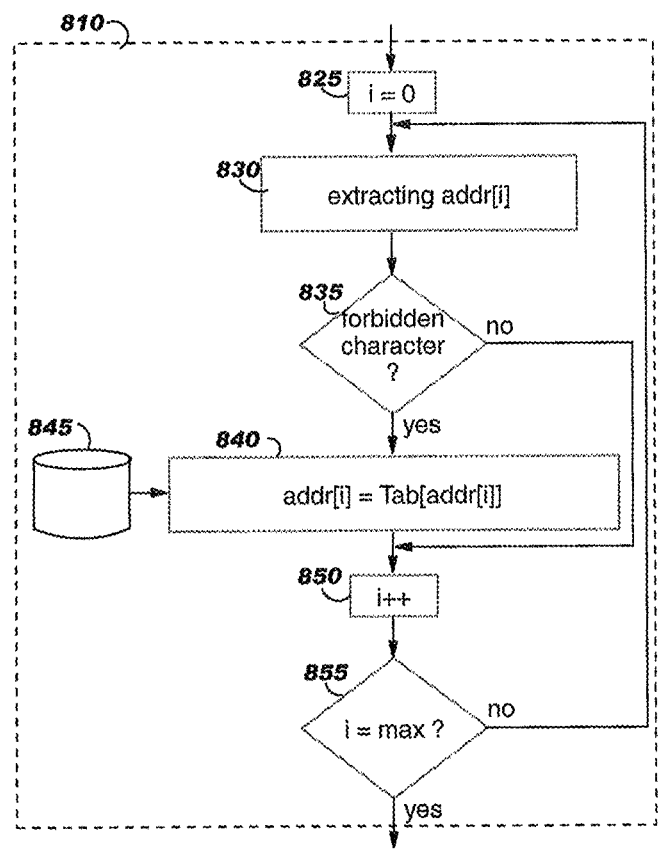

FIGS. 8a and 8b illustrate illustrates an example of the algorithm used to encode an address in a filename. As shown on FIG. 8a, a first step consists in getting the primary filename of the file (step 800), i.e. the filename of the file, and the address or URL of the voice check ticket (step 805). Then, the address is encoded (step 810) and merged with the primary filename of the file, using particular separators (step 815) before the file is renamed with the filename comprising the primary filename and the encoded address (step 820).

FIG. 8b depicts an example of the encoding algorithm referred to as step 810 on FIG. 8a. A variable i is set to zero (step 825) and the $i^{th}$ character is extracted from the address string (step 830). A test is performed to determine whether the extracted character is valid or otherwise forbidden by filename syntax rules imposed by the file system of the user's device (step 835). If the extracted character is a filename valid character, variable i is incremented by one (step 850) and a test is performed to determine if variable i has reached its maximum value that is, if all characters of the address string have been processed (step 855). If variable i has not reached its maximum value, the last four steps of the algorithm are repeated (steps 830 to 850). Else, if variable i has reached its maximum value, the process is stopped. If the character extracted from the address string is forbidden by the filename syntax rules, a corresponding valid character, or group of characters, is selected in lexicography table 845 and this selected character, or group of characters, replaces the forbidden one (step 840). Then variable i is incremented by one and the same test described before is performed to determine if variable i has reached its maximum value.

As an illustration of the algorithm described above, let us consider the case of a text file named "Biometric.txt", that a user would like to send to someone else as an encrypted e-mail attachment, using to this purpose a lexicography table to encode the voice check ticket address string into the filename, wherein "://" is associated to ";"

"/" is associated to ","

To get the voice check ticket allowing the opening of the file, it is required to access the voice check ticket corresponding to this file. For sake of illustration one can consider that this voice check ticket can be downloaded from the following URL:

http://www.voicecheck.com/tickets/R7KWW56.vct

Before the sender of the document "Biometric.txt" sends or attaches the document, an option such as "encrypt file" can be selected to encrypt the file to generate a voice check ticket, and to obtain the address or URL of this voice check ticket.

The filename is modified according to the algorithm illustrated on FIGS. 8a and 8b. Firstly, by using the previous lexicography table, the address is encoded as follows:

http;www.voicecheck.com,tickets,R7KWW56.vct

Then, the encoded address is merged with the filename. In this example, the encoded address is enclosed in parenthesis that are used as separators. The encoded address is inserted in front of the extension dot of the primary filename as follows:

Biometric(http;www.voicecheck.com,tickets,R7KWW56.vct).txt and the file is renamed using this modified filename.

It must be noticed that, for sake of illustration, this encoding algorithm is purposely very simple. A preferred one would consist in replacing a sequence of forbidden characters by a single one and in replacing sets of characters more compact codes e.g., replacing "http://" by "H!".

Among the advantages of the invention, one should noticed that, a sender protects files sent to a recipient, assuring and getting confirmation that those files are opened only by the intended recipient;

the sender of a file gets a non-repudiable confirmation of the reception of the file by the intended recipient, and gets informed of unsuccessful attempts to open the file by not authorized recipients or impostors; and, recording his or her own voice, any user can selectively protect any file for non-authorized access by other people.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for decoding an encrypted file, said method comprising:

receiving, by a recipient computer of a recipient from a sender computer of a sender, the encrypted file;

wherein the encrypted file has a filename that includes an encoded address in the filename, wherein the encoded address identifies where a voice check ticket is stored, wherein the voice check ticket comprises voice check text, and wherein a prior name of the encrypted file and the encoded address are merged together within the filename;

parsing, by the recipient computer, the received filename;

extracting, by the recipient computer, the encoded address from the parsed filename;

accessing, by the recipient computer, the voice check ticket at the encoded address extracted from the parsed filename;

receiving, by the recipient computer from the voice check ticket, the voice check text;

displaying, by the recipient computer, the received voice check text visually on a computer display of the recipient computer;

prompting, by the recipient computer, the recipient to read aloud the displayed voice check text;

receiving, by the recipient computer, an audio signal from a reading aloud by the prompted recipient of the displayed voice check text;

receiving, by the recipient computer, an identifier of the recipient;

transmitting, by the recipient computer to a server computer comprising a voice check server, the received audio signal and the received identifier of the recipient;

wherein the voice check server has converted the audio signal to first text, determined that the first text matches the received voice check text, computed a voiceprint of the audio signal, and determined that the computed voiceprint matches a voiceprint stored in a voiceprint database of the voice check server and associated with the transmitted identifier of the recipient;

receiving, by the recipient computer from the server computer, an encryption key; and decrypting, by the recipient computer, the received encrypted file using the received encryption key.

2. The method of claim 1, wherein the voice check ticket further comprises the encryption key.

3. The method of claim 2, wherein the voice check ticket further comprises a voiceprint identifier assigned to a voiceprint of the recipient.

4. The method of claim 3, wherein the voice check ticket consists of the voiceprint identifier, the encryption key, and the voice check text.

5. The method of claim 1, wherein the address is a Universal Resource Locator (URL).

6. The method of claim 1, wherein said receiving the encrypted file comprises receiving the encrypted file as an attachment to an e-mail message from the sender to the recipient, and wherein the voice check text is a copy of a portion of e-mail text of the e-mail message.

7. A system comprising:

a recipient computer of a recipient;

and a computer-readable storage medium storing instructions which, when executed by the recipient computer, causes the computer to perform a method for decoding an encrypted file, said method comprising:

receiving the encrypted file;

wherein the encrypted file has a filename that includes an encoded address in the filename, wherein the encoded address identifies where a voice check ticket is stored, wherein the voice check ticket comprises voice check text, and wherein a prior name of the encrypted file and the encoded address are merged together within the filename;

parsing the received filename;

extracting the encoded address from the parsed filename;

accessing the voice check ticket at the encoded address extracted from the parsed filename;

receiving from the voice check ticket, the voice check text;

displaying the received voice check text visually on a computer display of the recipient computer;

prompting the recipient to read aloud the displayed voice check text;

receiving, by the recipient computer, an audio signal from a reading aloud by the prompted recipient of the displayed voice check text;

receiving an identifier of the recipient;

transmitting to a server computer comprising a voice check server, the received audio signal and the received identifier of the recipient;

wherein voice check the server computer has converted the audio signal to first text, determined that the first text matches the received voice check text, computed a voiceprint of the audio signal, and determined that the computed voiceprint matches a voiceprint stored in a voiceprint database of the voice check server and associated with the transmitted identifier of the recipient;

receiving from the server computer, an encryption key; and decrypting the received encrypted file using the received encryption key.

8. The system of claim 7, wherein the voice check ticket further comprises the encryption key.

9. The system of claim 8, wherein the voice check ticket further comprises a voiceprint identifier assigned to a voiceprint of the recipient.

10. The system of claim 9, wherein the voice check ticket consists of the voiceprint identifier, the encryption key, and the voice check text.

11. The system of claim 7, wherein the address is a Universal Resource Locator (URL).

12. The system of claim 7, wherein said receiving the encrypted file comprises receiving the encrypted file as an attachment to an e-mail message from the sender to the recipient, and wherein the voice check text is a copy of a portion of e-mail text of the e-mail message.

13. A non-transitory storage medium comprising instructions which, when executed by a recipient computer of a recipient, causes the recipient computer to implement a method for decoding an encrypted file, said method comprising:

receiving from a sender computer of a sender, the encrypted file;

wherein the encrypted file has a filename that includes an encoded address in the filename, wherein the encoded address identifies where a voice check ticket is stored, wherein the voice check ticket comprises voice check text, and wherein a prior name of the encrypted file and the encoded address are merged together within the filename;

parsing the received filename;

extracting the encoded address from the parsed filename;

accessing the voice check ticket at the encoded address extracted from the parsed filename;

receiving from the voice check ticket, the voice check text;

displaying the received voice check text visually on a computer display of the recipient computer;

prompting the recipient to read aloud the displayed voice check text;

receiving an audio signal from a reading aloud by the prompted recipient of the displayed voice check text;

receiving an identifier of the recipient;

transmitting to a server computer comprising a voice check server, the received audio signal and the received identifier of the recipient;

wherein the voice check server has converted the audio signal to first text, determined that the first text matches the received voice check text, computed a voiceprint of the audio signal, and determined that the computed voiceprint matches a voiceprint stored in a voiceprint database of the voice check server and associated with the transmitted identifier of the recipient;

receiving from the server computer, an encryption key;

decrypting the received encrypted file using the received encryption key.

14. The storage medium of claim 13, wherein the voice check ticket further comprises the encryption key.

15. The storage medium of claim 14, wherein the voice check ticket further comprises a voiceprint identifier assigned to a voiceprint of the recipient.

16. The storage medium of claim 15, wherein the voice check ticket consists of the voiceprint identifier, the encryption key, and the voice check text.

17. The storage medium of claim 13, wherein the address is a Universal Resource Locator (URL).

18. The storage medium of claim 13, wherein said receiving the encrypted file comprises receiving the encrypted file as an attachment to an e-mail message from the sender to the recipient, and wherein the voice check text is a copy of a portion of e-mail text of the e-mail message.

\* \* \* \* \*